(12) United States Patent
Pupulin et al.

(10) Patent No.: US 8,408,819 B2
(45) Date of Patent: Apr. 2, 2013

(54) CAMERA HOLDING MODULE AND DEVICE FOR RELIEF SHOOTING

(75) Inventors: Yves Pupulin, Paris (FR); Yves Perles, Paris (FR)

(73) Assignee: Binocle, Bry sur Marne (FR)

( * ) Notice: Subject to any disclaimer, the term of this patent is extended or adjusted under 35 U.S.C. 154(b) by 0 days.

(21) Appl. No.: 12/742,071

(22) PCT Filed: Nov. 7, 2008

(86) PCT No.: PCT/FR2008/001584
§ 371 (c)(1),
(2), (4) Date: Jul. 27, 2010

(87) PCT Pub. No.: WO2009/092924
PCT Pub. Date: Jul. 30, 2009

(65) Prior Publication Data
US 2010/0296807 A1 Nov. 25, 2010

(30) Foreign Application Priority Data
Nov. 7, 2007 (FR) ...................................... 07 07816

(51) Int. Cl.
*G03B 17/00* (2006.01)
(52) U.S. Cl. ...................................................... 396/428
(58) Field of Classification Search .................. 396/428, 396/322, 325
See application file for complete search history.

(56) References Cited

U.S. PATENT DOCUMENTS

| 2,838,975 | A | * | 6/1958 | Halprin et al. | 396/325 |
|---|---|---|---|---|---|
| 3,769,890 | A | * | 11/1973 | Alasia | 396/324 |
| 4,418,993 | A | * | 12/1983 | Lipton | 352/57 |
| 4,557,570 | A | * | 12/1985 | Hines | 396/325 |
| 4,650,305 | A | * | 3/1987 | Hines | 396/325 |
| 4,734,756 | A | | 3/1988 | Butterfield et al. | |
| 5,978,015 | A | * | 11/1999 | Ishibashi et al. | 348/47 |
| 6,701,081 | B1 | | 3/2004 | Dwyer et al. | |
| 7,643,748 | B2 | * | 1/2010 | Cameron et al. | 396/325 |
| 2006/0204240 | A1 | | 9/2006 | Cameron et al. | |

FOREIGN PATENT DOCUMENTS

JP  2-260890  10/1990

* cited by examiner

*Primary Examiner* — Clayton E Laballe
*Assistant Examiner* — Linda B Smith
(74) *Attorney, Agent, or Firm* — Morgan, Lewis & Bockius LLP

(57) ABSTRACT

The invention relates to a camera holding module for stereoscopic shooting, characterized in that it comprises: a carriage mobile in translation (2) along at least one guiding rail, driven by a driving device; a camera-holding rotary member (3) having a rotation axis and a guiding member (32) carried by the mobile carriage, as well as an actuator (27) interacting with the guiding member for initiating the movement thereof in order to rotate the camera holding member.

8 Claims, 7 Drawing Sheets

CAMERA HOLDING MODULE AND DEVICE FOR RELIEF SHOOTING

RELATED APPLICATIONS

The present application is a U.S. National Phase Application of International Application No. PCT/FR2008/001584 (filed Nov. 7, 2008), which claims priority to French Patent Application No. 0707816 (filed Nov. 7, 2007), all of which is hereby incorporated by reference in their entirety.

Relief photography has existed since the middle of the 19th century, and various solutions have been considered regarding the relative positioning of two photographic appliances or two cameras which can be incorporated in a single housing or placed on supports for side-by-side or mirror positioning.

In 1999, the applicant company unveiled a world first in the form of a digital stereoscopic camera at IBC (Amsterdam), which, by virtue of a motion drive allowed instantaneous control of the relief suitable for a live television feed.

This first stereoscopic camera consisted of two SDI cameras ("Microcam" from Thomson Broadcast Systems), and had all the motor drives needed to ensure a controlled relief immediately upon shooting using a viewing and control device providing a real time display of the relief image but also the various parameters of the image and motion control. This camera provided the first multiple-camera filming with live projection onto a big screen including the variations of all the relief shooting parameters (center-to-center distance, vergence, zoom, focus and diaphragm).

A world first in picking up a relief television transmission took place on Jul. 1, 2000 in Clamecy in Nièvre (France).

The motor-driven parameters were as follows: center-to-center distances between the cameras, vergence of the cameras (that is to say, the convergence angle between the two optical axes of the cameras) on the two Angénieux-branded variable-focus lenses, focusing, diaphragms and zooms.

The paired parameters were, apart from the mechanical axes, all the image management parameters deriving from the CCU (Camera Control Units), of the two cameras forming the stereoscopic pair and the optical axes.

The N-camera relief shooting systems (N being greater than or equal to 2) currently implement an assembly of components that result in great mechanical complexity and large bulk, drawbacks to which a high cost must be added.

The invention proposes remedying at least one of these drawbacks by virtue of a modular design that makes it possible to produce stereoscopic cameras from elements that are common to all the cameras: the modules. These modules are used to reduce the bulk by incorporating all the mechanical and electronic functions and notably systematizing and simplifying the control of the stereoscopic shooting parameters, once the latter have been incorporated in a relief shooting device.

The invention thus relates to a camera-holding module for relief shooting with N cameras, characterized in that it comprises:
  A rigid framework, called body of the module, which can combine, on its various faces, the mechanical and/or electronic elements.
  A carriage that is mobile in translation in a translation plane and that has a guiding means for cooperating with at least one guiding rail supported by a first face of the module body, as well as a device for driving said mobile carriage.
  A camera-holding rotary element supported by the mobile carriage and having a rotation axis, and a guiding element, as well as an actuator cooperating with the guiding element to induce its movement so as to rotate the camera-holding element, notably over a maximum rotation angle of 10°, and more particularly of 5°, the device for driving the mobile carriage in translation being positioned between the actuator and the rotation axis of the rotary element.

This arrangement, in which the rotation control of the camera-holding rotary element is distinct and distant from the rotation axis of this element allows for a compact architecture which makes it possible to produce modules incorporating all stereoscopic shooting functionalities. The guiding element advantageously slides in a guiding slot formed in the mobile carriage.

The carriage that is mobile in translation can be guided by two parallel guiding rails, the camera-holding rotary element extending at least into the space between the two guiding rails.

Advantageously, the rotation axis of the camera-holding rotary element is positioned above a first rail.

The actuator is preferentially situated outside the space between the two rails whereas the guiding element is positioned in a region of the camera-holding rotary element, beyond the space between the two rails.

The device for driving the mobile carriage in translation can be positioned in the space between the two rails.

Advantageously, the actuator and/or the driving device is a ball screw or a worm screw.

The camera-holding rotary element can incorporate a camera slide support.

The rotation about the axis can be obtained by virtue of an elastic element allowing a said rotational driving movement in one direction and having a greater stiffness in the other directions.

The maximum rotation angle of the rotary element may be at most equal to 10° and more particularly to 5°.

The module can have a seat correction device with, notably, three points which is incorporated in the module body, and which comprises three control members housed in grooves formed in a second face of the module body opposite to the first face, as well as three elements that are mobile perpendicularly to the translation plane of the module.

The invention also relates to a relief shooting device, characterized in that it comprises at least one module as defined hereinabove and a control device able to generate parameters for controlling the mobile carriage and the camera-holding rotary element of the module or modules, as well as at least the focusing of the camera or cameras supported by the module or modules. The device can have at least two modules as defined hereinabove. It can have at least one rotation module having only one said rotary element, therefore with no carriage that is mobile in translation.

The control device can then have:
  a first so-called level 1 operating mode, in which said parameters are adjusted independently of one another,
  a second so-called level 2 operating mode in which at least one parameter is slaved to another parameter, the two parameters being, for example, the vergence angle and the focusing distance.

The control device can have a third so-called level 3 operating mode in which a first parameter is slaved to a second parameter, which is slaved to at least one third parameter. For example, the first parameter is the center-to-center distance between two cameras of two modules, the second parameter is the vergence angle between said two cameras, and the third parameter is the focusing distance.

Advantageously, the modules are mounted at right angles, at least two modules being positioned either side of a semi-reflecting return mirror.

At least one pair of symmetrical modules can be mounted head-to-tail in one and the same casing. The device can then have two said casings right-angle-mounted either side of a semi-reflecting mirror, with the axes of the cameras supported by the modules mounted in the respective casings interleaved.

The invention also relates to a set of modules as defined hereinabove, characterized in that it comprises modules of different sizes for cameras of different types, and in that the control parameters of the modules are independent of the module, so that the control signals from a control device can be used for all the modules of the set of modules.

Other features and advantages of the invention will become more apparent from reading the following description, given as a nonlimiting example, in conjunction with the drawings in which.

Figure 1A:
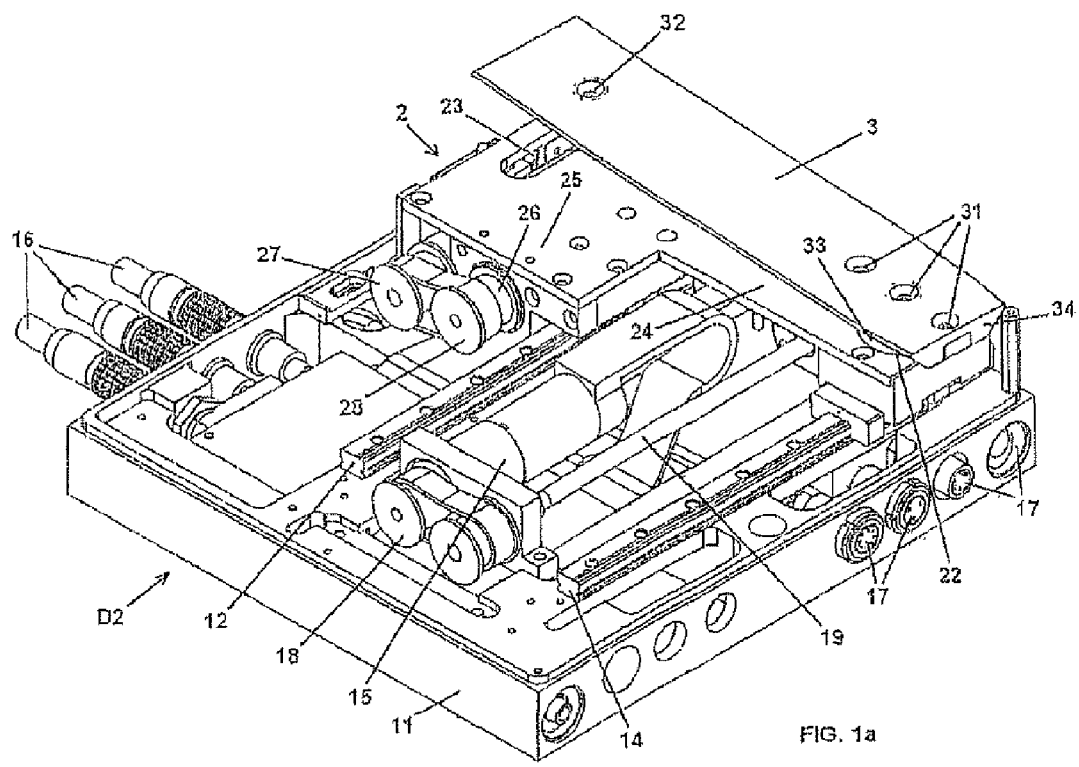
FIGS. 1a to 1c show a preferred embodiment of a module D2 according to the invention, respectively in perspective from above (1a) and from below (1b) and in plan view (1c)

The invention relates to the production and management of relief shooting cameras with N points of view (with N greater than or equal to 2) managed by motion control, operating notably by learning.

These cameras are supported by modules that can have different sizes and identical functionalities positioned on supports that are said to be "side by side" or "at right angles" for all the shooting configurations.

These modules and supports are versatile, of identical use and can advantageously use the same command language regardless of the weight, the volume and the scale of the variations that can be used by each of the shooting systems with 2 points of view or more (N being greater than 2).

The invention relates more particularly to the production of camera-holding modules that can be adapted to all relief shooting devices with 2 or N points of view regardless of the image standard, the volume or the weight of each of the cameras forming the 2 or N points of view.

These modules are suitable for cameras of different resolutions, volumes and weights and can be compatible with each other.

For example: SD, HD, 2K and 4K cameras weighing 0 to 5 kg, 5 to 10 kg and 10 to 15 kg, etc.

These modules are identical and adaptable regardless of the device in which they are incorporated with 2 or N cameras, and are symmetrically positioned. The right or left modules for camera booms, shoulder camera, high-angle shot "steady-cam" etc. are advantageously reversible and comprise the same mechanical and electronic elements, but, above all, the same scales for managing and reading positioning recorded by the motion control.

These modules are independent of one another but can house complementary functionalities:

EXAMPLE a single 3-level generator is sufficient for all of the device with 2 or N cameras. It then synchronizes the cameras through the motion control.

c) These modules can incorporate a large number of elements, at least one being chosen from the following list:

- All the mechanical, electronic, computing functionalities (a mini-PC may be included in the module support, in the master module or alongside the motion control in the transportable version) associated with the vergence, the center-to-center distance and the altitude, roll and tilt corrections enabling the optical axes to be mixed.
- The electronics for zooms, focusing and diaphragms.
- The gear motors coding the vergence, center-to-center distance and attitude correction parameters.
- The end-of-travel detectors.
- The distribution and intercommunication, back plane and other cards.
- The actuator management and power cards,
- The 1-, 2- or 3-level synchronization signal generators.
- The elements for measuring and reading positions in time: time code, universal time clock, and in space: of compass, GPS, altimeter, inclinometer, laser telemeter, and other such types.
- The cable or wireless ("Wi-fi", "bluetooth") control and transmission systems.
- The data storage computer system (flash memory, hard disk, USB key, etc.).
- A pick-up microphone for the clapper or the 1000 Hz of an electronic clapper stored with the motion control data.
- An HF receiver for a TC transmitted by a TC generator.
- A computer for the commands and for collecting all the data.
- The connectivity enabling all electrical and control signals to be swapped and transferred in order to be operable, switchable and interlinked, for example, by a network (e.g.: RS 485, USB, Ethernet) regardless of the method of assembly and regardless of the operator who intervenes: the stereographer, the cameraman or the camera assistant can intervene on the various controls in order to simplify the distribution of the tasks. These tasks are complementary, hierarchically organized and switchable.

The modules are interchangeable and, in the event of failure, the modules can be exchanged without losing the history, stored on the microcontroller or flash memory, of the data (position readings) from the preceding settings.

The modules are versatile: all the right modules interface with all the left modules:

1. D2: a right translation and rotation module
2. G2: a left translation and rotation module symmetrical to the module D2.
3. D1 and G1: respectively right and left rotation modules.

D1' and G1' lightened right or left rotation module (compatible with D2/G2) (that is to say with no seat correction control, except by manual adjustment) for high-angle shot, helicopter. The particular feature of these modules is that they are placed directly in a module D2/G2 in order to impart, within the very module, a second rotation designed to considerably reduce the volume of the whole (see FIG. 8).

All these modules are constituent elements of cameras with N points of view.

The modules are produced on the basis of a scale factor but advantageously deliver identical and compatible reading values in order to use a common transfer and display system that is compatible with all the combinations.

The modules are organized as follows:

A) Incorporation of the rotation and translation in a single mechanical casing.

The modules that incorporate rotation and translation are unique, which provides for a considerable space saving. They are symmetrical in order for the same parts to independently constitute a left or right module.

B) These casings contain all the mechanical elements, electronic elements and software elements (if the mini-PC is incorporated), for managing motion control and stereoscopy.

C) The rotation is provided by a system over 360°, of a ball, needle or roller bearing type. However, for relief shooting, its rotation is limited to a small angle, more particularly less than 10° and more particularly less than 5° per module.

Since these devices can also be used for multiple-camera panoramic filming over 360°, the complementary cameras, regardless of their number, can, in this case, film by themselves over angles ranging up to 90° or more to adjust the field edges.

D) A limited rotation can be provided by a system without revolving elements in order to avoid the problems of play (pitch and lack of stiffness) if the lack of accuracy is to be minimized, and more particularly during mirror-mode relief shooting.

Figure 9:
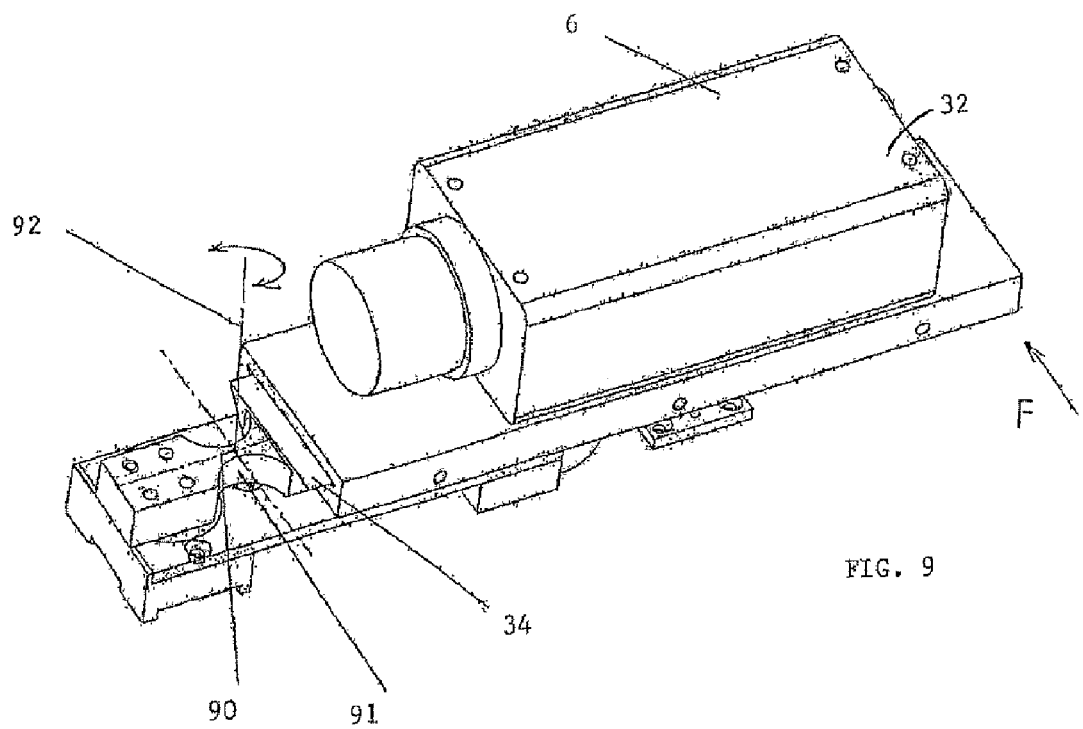
FIG. 9 illustrates a rotation control means for a camera-holding rotary element.

This rotation can be provided by a flexible coupling having a single motion capability in an axis 92 and a great stiffness in the other in order to prevent vertical or twist angular variations. FIG. 9 shows an embodiment in the form of a metal plate 90, for example made of non-quenched steel, having a pinched region 91, in this case with an arc-of-circle profile. The rotation is controlled by the element 32 in the direction of the arrow F. The rotation is produced by the elasticity of the metal, therefore linearly and without play. The thickness of the plate which is much greater than the width of the pinched region 91 ensures great stiffness in the directions other than the direction of the arrow F which is useful to the vergence of the cameras.

This 5 or 10° amplitude rotation for relief shooting with N points of view is produced by a linear motion (ball screw) or rotational motion (worm screw) so that there is uniformity between systems supporting cameras of different sizes and weights.

E) In the case of a highly accurate ball screw drive, a limitation is imposed on the rotational plays produced when the camera, oscillating about the optical axis, exhibits possibilities of play or collapse according to the pressure variations due, for example, to gravity or to vibrations when filming in a traveling vehicle, helicopter or any vibrating craft, and in the case of rolling (rotation movement about the optical axis) which brings about a significant variation in the effect of gravity on the mechanical couplings.

Regardless of the size of the modules producing the translation and rotation movements, the coding scale for the motion control movements is advantageously homothetic between camera support craft of different sizes and weights.

F) Furthermore, regardless of these size and weight variations, the angular rotation value is advantageously associated with an identical number of natural pitches, with no intervention other than to choose a rotation angle.

All the cameras are therefore linked by a motion control code which may be unique regardless of their volumes and their weights, that is to say the logic system and the mechanical scales used to actuate the rotation or the translation of a camera weighing 200 grams and 10 kg are strictly compatible in that the same command produces the same effect.

This is obtained by the pairing of all the gear motors and mechanical intermediaries retaining the same coefficients regardless of the torques and powers needed for all the gear motors and all the devices.

Whether these assemblies have the same gearing coefficients at all levels regardless of the location of the controls and their ergonomics used to impart a rotation or a translation, whereby X coding pitches correspond to the same translation or to the same rotation.

Such a device is able to ensure the compatibility of the various production processes for the stereoscopic subsystem, virtual or real, from script, through filming and postproduction to broadcast, regardless of the real and virtual tools used that are compatible with this data transfer system.

Figure 1B:
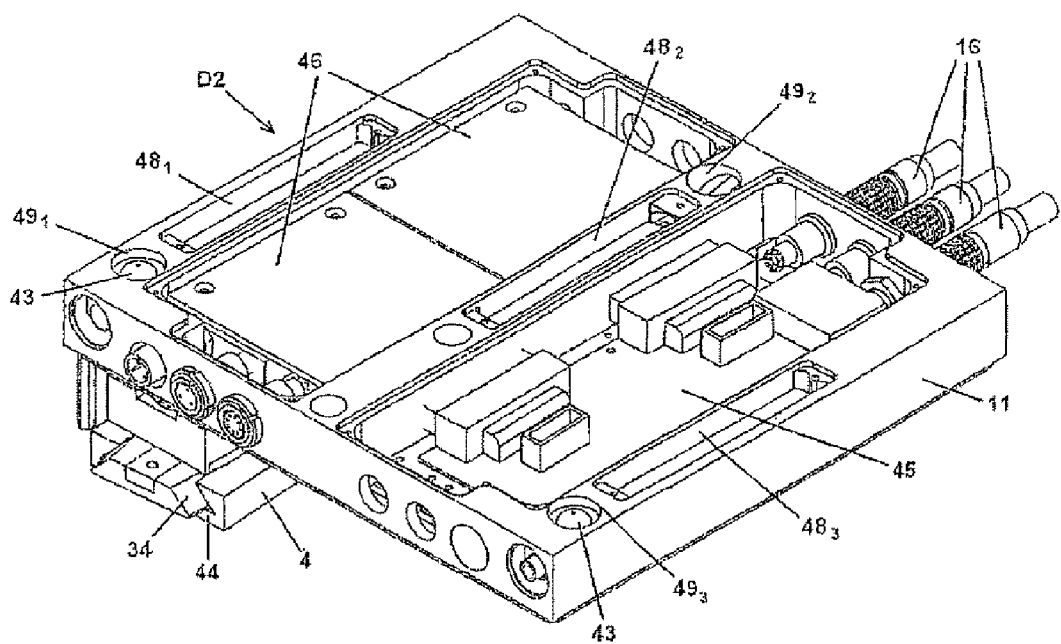
Figure 1C:
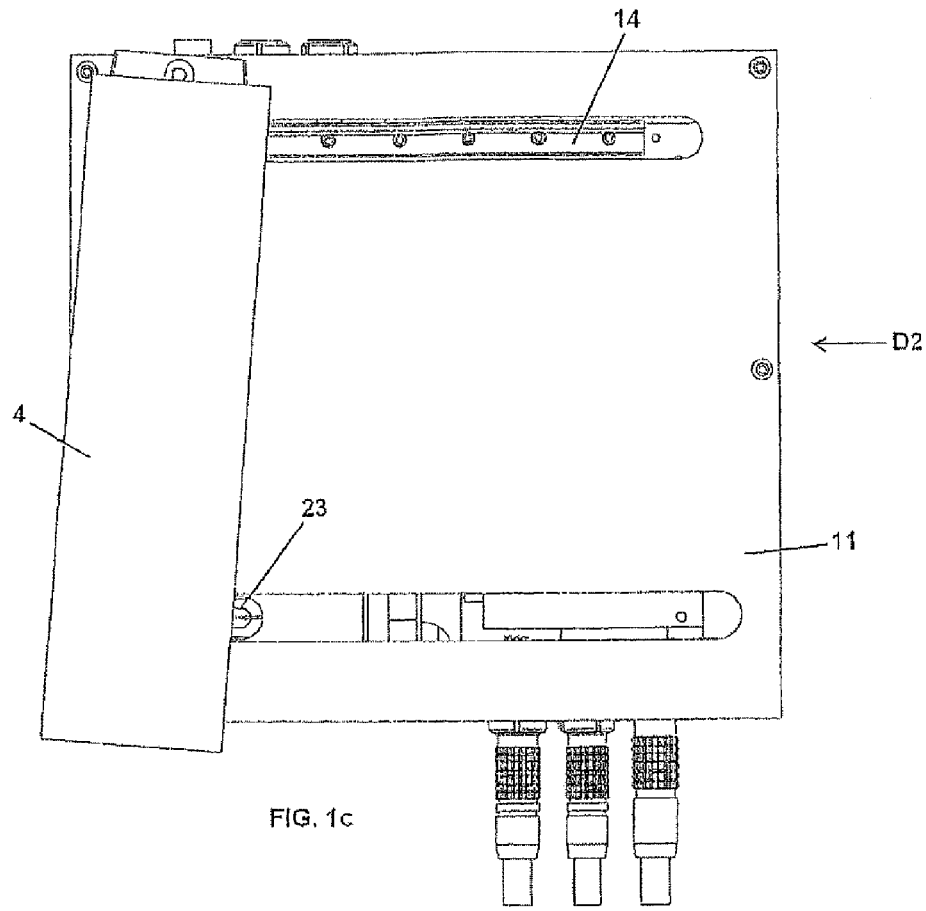

FIGS. 1a to 1c illustrate an example of a module D2 comprising a main plate or body 11, the top face of which is fitted with sliders 12 and 14 which provide translational guidance for a carriage 2 on which a camera support 3 is mounted. Between the rails 12 and 14 there is a device which controls the translation of the carriage 2. A direct current or brushless stepper motor 15 uses a transmission 18 to drive a ball screw 19 or a worm screw. The carriage 2 can thus be moved over the entire width of the plate 1 to adjust the separation between the cameras and therefore the stereoscopic base between two cameras whose images produce a stereoscopic pair. The widest module represented and referenced D2 (or G2) corresponds to the case of a 2-camera system which nominally requires a variable stereoscopic base that is as wide as possible and therefore the possibility of varying the two translations simultaneously. For systems with N points of view (N being greater than 2), narrower modules can be used. These modules, named D1 or G1, comprise only the rotation with the same mechanism as for the modules D2 and G2, and no translation (variation of the center-to-center distance between the optical axes of the cameras) which, in this precise case, will advantageously be placed on the supports of the various modules.

The module D2 or G2 also has, on the body 11, connectors 16, 17 for electronic cards which can be housed in the cavities (in this case 2 of them) of the body 11 (FIG. 1b).

The carriage 2 has, in the vicinity of the front face of the module, an opening 22 to receive the rotation axis 33 of the camera support 3 which is situated in the vicinity of one of its ends, and more particularly in the example represented above, the rail 14. At its other end, the camera support 3 has a finger 32 that slides in a groove 23 to guide the rotation of the support 3. This rotation can be used to adjust the vergence angle. The movement of the finger 32 over a trajectory of large curvature is controlled by a translation movement produced by a ball screw or worm screw 27 controlled by a stepper motor and relayed by a transmission 28. The motor, transmission and screw device 27, 28 is housed in the bottom part of an extension 25 of the carriage 2 situated outside the gap between the rails 12 and 14, which houses the translation mechanism 15, 18, 19 for the carriage 2.

This topography allows highly accurate translation movements of the carriage 2 (which defines the stereoscopic base) and rotation movements of the support 3 (which defines the vergence) while ensuring great compactness.

The interpenetration of the translation and rotation assemblies provides a considerable space saving compared to the assemblies encountered in the currently known professional stereoscopic shooting systems which simply superpose existing translation and rotation systems designed for movements over 360°, but, by contrast, distributing the functions either side of the translation rails 12 and 14 provides an appreciable space saving while considerably increasing rotation accuracy. In particular, the rotation radius of the support 3 is much greater in this topography while providing for a smaller bulk.

The back plane cards housed in the cavity 45 and which supply both the translation and rotation management cards 46 and the camera synchronization cards also provide a space saving by being incorporated between the grooves $48_1$ to $48_3$ reserved for the seat corrections and optical alignments.

All of these cards can therefore be contained in a single casing forming a control module, which thus makes it possible to manage all the parameters without adding bulky elements.

The "3-level" management cards, the mini-PC or any other cards can equally well be situated in one or other of the modules of the shooting system with N points of view (N being greater than or equal to 2).

It should be noted that the modules of types D1 or G1 that incorporate only rotation can, provided that they are mounted in plates 11 for modules D2 and G2, exploit a significant storage space available for all the management, GPS and other systems described previously.

The mechanical assemblies for the optical alignment of the cameras that incorporate optical sensor and support are consistent for 2D but not for relief (3D) shooting. The seat and the angle formed at their intersections by the shooting angles must then be corrected using a three-point system, in order to minimize the vertical and seat disparities of the cameras.

This aspect is important, in the case of stereoscopic shooting with two but also N points of view, for aligning the optical axes of the different cameras.

The lifts that adjust the altitude of each of the faces of the tripod perpendicularly to the translation plane of the modules operate as follows. In the three grooves $48_1$ to $48_3$ situated at the center and on the sides of the body of the modules, coding gear motors (not shown) are installed, the axis of which is a screw that operates a tapered part. This part acts as a motion return and acts on a mobile element, for example with hemispherical head 43 forming a captive lift which slides within a respective range $49_1$ to $49_3$ and raises the module by a point. These three mobile elements bear on three points of the module supports which are used for side-by-side or right-angle mounting, an elastic fastener providing a return force enabling them to exercise their lift function.

The three-point adjustment with, for example, an adjustment amplitude of a few millimeters (typically 3 mm) makes it possible, within a very short time, to sort out all the optical alignment or seat problems, and, with respect to a motion control, reproduce this correction for zoom drift for example.

The modules D1, D2, G1 and G2 can receive and distribute the management and image supply currents.

Figure 2A:
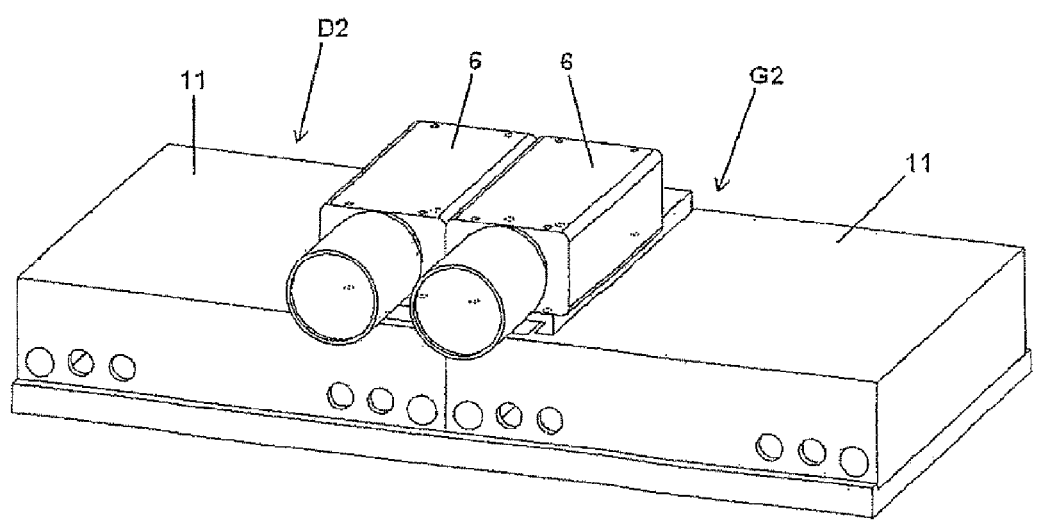
FIGS. 2a and 2b illustrate two embodiments of a stereoscopic device with two cameras placed side by side (2a) or at right angles (2b) and using two modules D2 and G2 according to the invention.
Figure 3:
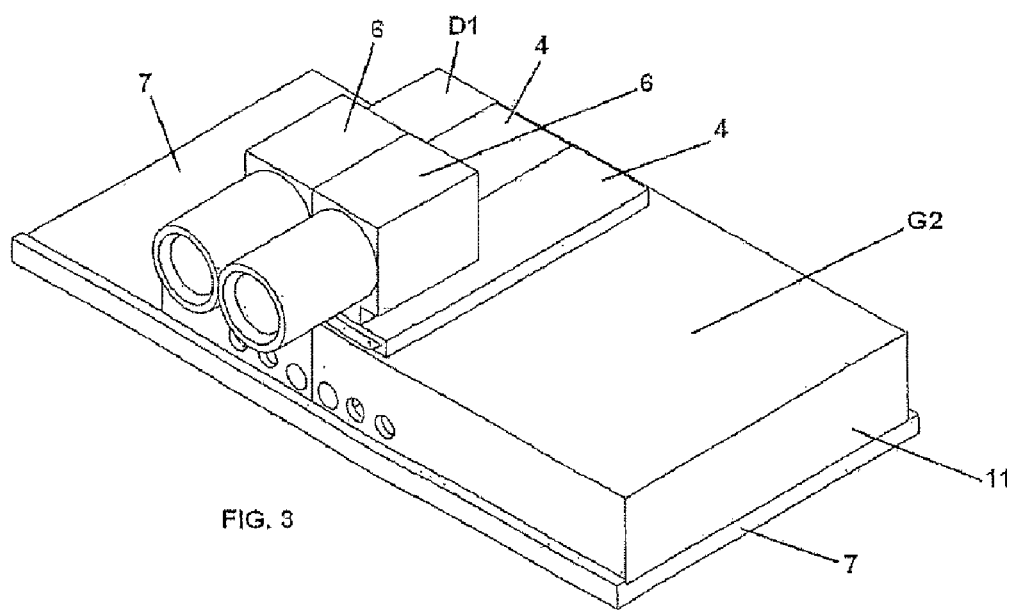
FIG. 3 illustrates a stereoscopic device with two cameras using two modules D1 and G2 placed side by side.

For the cameras, the connections and their cables can be incorporated in the module supports whether they are right-angled (FIGS. 4 and 5) or side by side (FIGS. 2*a* and 3).

1) Current distribution mode provides module versatility without affecting the organization of the commands between the various modules.

Since management is transmitted by an RS485 bus or another type of databus, the modules are versatile position-wise, but also relation-wise. Their position in the hierarchy of the operations remains open to decision at any moment. It is this particular feature of the modules that allows the function and command hierarchies to be organized on demand.

2) General management of the motion control (notably by learning) controlling N modules of N cameras.

Motion control can be managed by control appliances which can be controlled close to the camera by the operator, close by or remotely by the camera assistant linked to the camera device by cable, "bluetooth", "Wi-fi" or other wireless systems, and by the stereographer, the head cameraman or the director from the workstation controlling the relief with N cameras.

The addition of commands and the hierarchy of these commands, involving on the one hand a priority and on the other hand the slaving of all the motion control functionalities to one another, are distributed discretionally depending on whether the operator is the only one to operate or whether he has one or more assistants or whether he shares the technical setting decisions with a stereographer, a director or the head cameraman of the film.

The hierarchy is not linked only to functionality but also to the various controls that are organized according to the independent choices of the different controls. In this light, the modular design described allows great flexibility as much from the hardware point of view as from the command management point of view.

The shooting has to be considered with a will to characterize the setting and control the parameters of the relief to provide viewing comfort for the viewer.

For example:

It may be decided that the focusing slaves the vergence (that is to say, the vergence angle), or that, conversely, the vergence slaves the focusing as in human observation.

If a vergence angle has been determined by the director as being limited to a maximum angular value, then, the vergence will no longer vary once this value is reached. However, it is possible to consider that, when this angle is reached, it is maintained using a variation of the center-to-center distance by algorithm in order to retain the determined angle.

The term "hierarchy" is used to mean the organization of the different functions relative to one another.

When the commands are all independent of one another, we say that we have a level 1 hierarchy: one or more operators adjust the various parameters of the motion control or of the camera independently of one another.

When a parameter is slaved to another it is said to be of order 2 (for example, focusing to vergence or vergence to focusing).

When an axis is slaved to another, itself linked to a first control: it is said to be of order 3. Such is the case of the center-to-center distance subject to the constant vergence angle which must in turn follow the focusing with no variation of the vergence angle. The effect obtained is to maintain the subject within the plane of the screen without leaping forth or shrinking back in the depth of the frame.

Different hierarchical systems can coexist, provided that the image/image position readings take this into account.

The commands can be divided up into different hierarchies. For example, the center-to-center distance is subject to the vergence which is subject to focusing and the camera speed is subject to variations of the diaphragm in order to obtain a constant exposure associated with a speed variation effect in the relief shooting with N points of view, the images of which, two by two form stereoscopic pairs. Film cameras already have these functions and are therefore autonomous for these functions in 2D mode, but the data must be retained and then transmitted at the various film production steps. Since the data is associated with each image, a speed variation in shooting must be included in the data record.

An axis of a shooting system can also slave the axes of different cameras in a system with N points of view, but also N systems with N points of view.

If we consider shooting with N points of view, the focusing of the master camera can control all the focusings, but it can also subjugate all the vergences which must then coincide.

Eight cameras side by side or in mirror configuration (FIG. 5) converge on the same focusing plane with different angular values greater than the angle of the two cameras placed at the center. They will therefore be slaved two-by-two but must coincide at the same point as all the other pairs, including the master pair.

In the case of an odd number of cameras, 9 for example, the one placed at the center of the device will control all the pairs distributed to its left and its right. The vergence of all the cameras will be on a point of its optical axis, which is itself normal to all of the device.

Several devices can also be subjugated to one of them.

The hierarchy can depend on the parameters associated with stereoscopy values, for example a disparity in the number of pixels or in millimeters on a particular screen, according to the size of the destination screen can also be included in the hierarchy. In this case, the operator may be warned that the disparities envisaged have been exceeded by any visual or audible system that can be incorporated in the control and communication devices of the various technicians.

3) Motion control can not only manage the parameters of the optical axes in real time, but can "replay" the variations of these axes in a deferred shooting. The capacity to replay certain parameters of a scene incorporating new parameters therein or by changing the values of some of them to various degrees of hierarchy makes it possible to control very complex shootings for which each axis or group of axes is learned one after the other, to control the shooting of composite shots but also film different shots or sequences while retaining the same parameters throughout a sequence or the film.

4) If a composite shot is filmed, certain parameters stored in other shootings have to be retained while keeping the possibility of intervening on some of the motion control parameters.

If, for example, a comedian is filmed against a backdrop, it is possible to automatically reproduce the variations of the parameters used in the first shooting on the same comedian. However, the focusing, or any other parameter, may, based on a scene-setting decision, be treated differently.

Another example: different phantom characters may appear throughout a film, but the parameters of the first shooting or later shootings will be repeated during the filming.

5) The modules can incorporate a dovetail 34 which serves as a support for a camera slider 4 provided with a complementary profile 44. This slider 4, on which the camera 6 is mounted, makes it possible, depending on the optical device, to situate the object nodal point in the rotation axis for mock-up filming or to position the front face of the lens against the mirror 57 (in the case of a mounting such as in FIGS. 4 and 5 for example) in order to limit the field of coverage needed for the mirror 57.

The sizes of the dovetails 34, 44 depend on the cameras 6 that they support. We will approximate the models of the manufacturers by trying to minimize the bulk, because of the current trend to lighten digital cameras.

II) Module Supports a. The supports, like the modules, are versatile and compatible. They are of different scales but keep the same functionalities regardless of the modules that they receive.

b. Support versatility:

The modules can be used independently at right angles (FIGS. 2*b* and 4 to 6) or side by side (FIGS. 2*a* and 3).

The right angles are of different types.

Figure 2B:
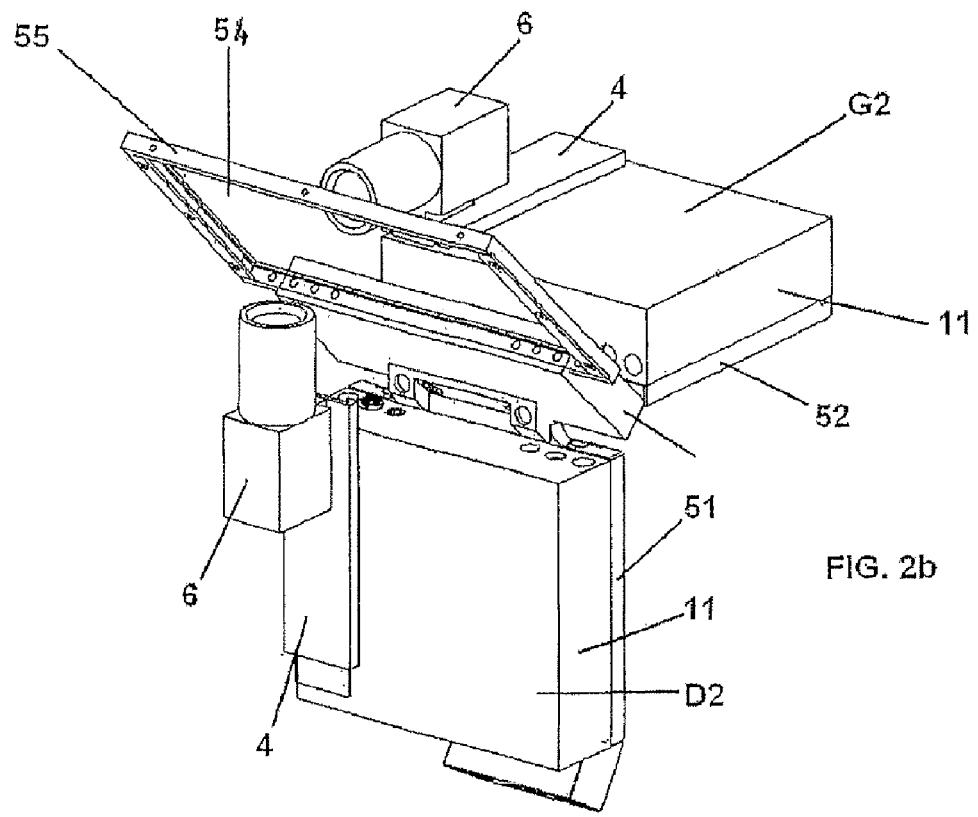
Figure 4:
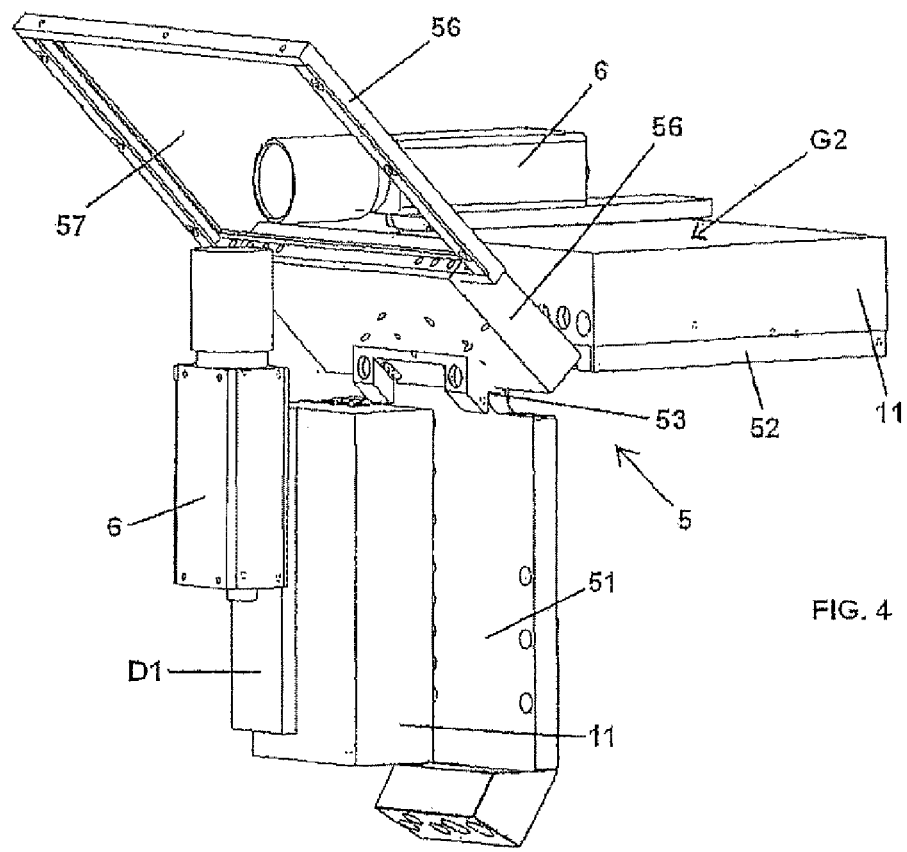
FIGS. 4 and 5 show two exemplary stereoscopic devices with two cameras (FIG. 4) and with eight cameras (FIG. 5) equipped with modules according to the invention with a so-called zenith bracket mounting.
Figure 5:
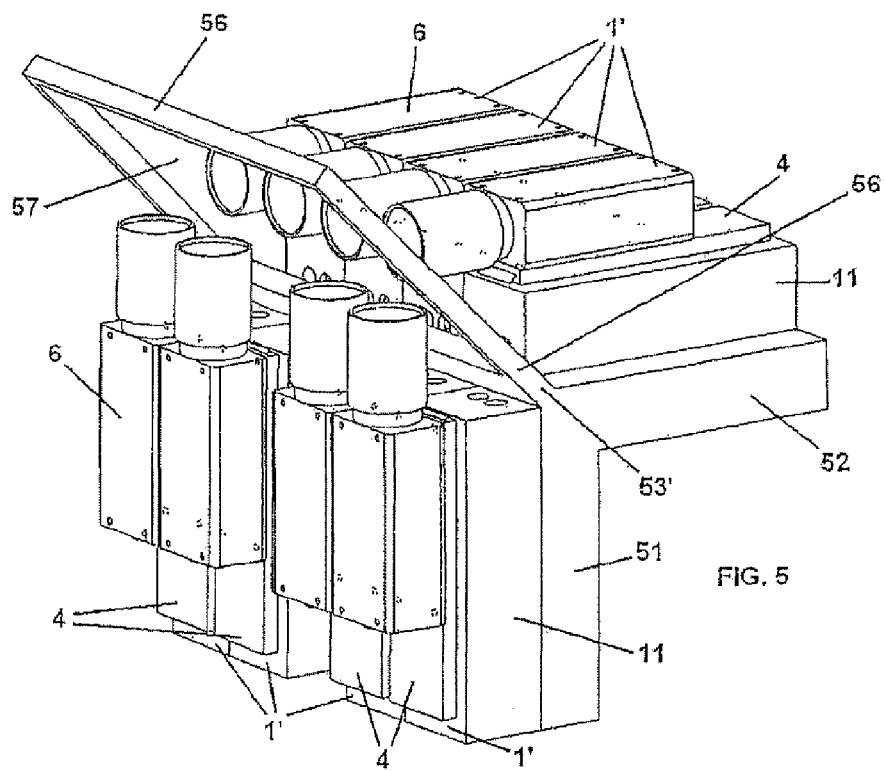
Figure 6:
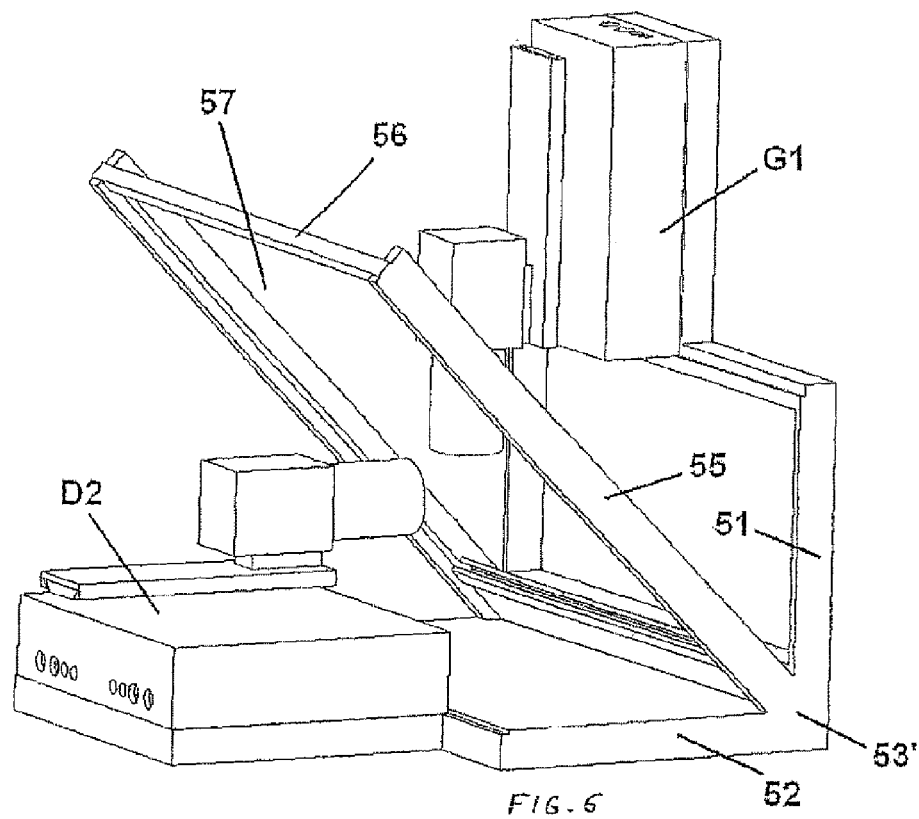
FIG. 6 illustrates a so-called "crane"-bracket bracket mounting for two modules D2 and G1.

We say that a right angle as in FIGS. 4 and 5 is a "zenith" right angle when its mirror 57 is on the plane bisecting the right angle from the side of the 270° angle and that the two bottom faces of the cameras are facing at an angle of 90° (see FIGS. 2*b*, 4 and 5). In these figures, the modules of the cameras are fixed to the supports 51 and 52 that make up the right angle and the mirror 57 is supported by a frame 55 and 56 articulated at 53—FIG. 4—with the supports 51 and 52 (or even linked in a fixed way at 53'—FIG. 5—to these supports). This configuration provides the best protection for the two surfaces of the mirror 57 from the parasitic light that generally comes from above, whether shooting outdoors or in a studio. FIG. 2*b* shows a shooting configuration supported on the left shoulder with a module D2 and a module G2. In FIG. 4, the module D2 is replaced with a module D1, that is to say, with no translation capability. In practice, for stereoscopic shooting using a device supported on the shoulder, a center-to-center distance that can be adjusted on just one module is generally sufficient to define the stereoscopic base.

We state that a right angle is in "crane" configuration when the mirror is situated in the plane bisecting the 90° angle. This configuration (FIG. 6), with modules D2 or G1, as shown (or even D2 and G2) is less favorable for the sun but it does make it possible to place the assembly in a horizontal plane very close to the ground, which is favorable to low-angle shooting in a real set.

We state that a right angle is mixed when the inversion of the high/low images makes it possible to use the same device for both applications.

The side-by-side supports 7 (FIGS. 2*a* and 3) allow N modules D2/G2 and/or D1/G1 to be juxtaposed, but may incorporate spreaders (not shown) to place the N supports distant from one another for very distant shooting for example.

c. Functionalities of supports 7, 51, 52

The supports 7, 51, 52 are placed directly on all the cinema- or television-dedicated machinery so that they replace the usual supports such as the manufacturers' dovetails that form the interface between the cameras and the motor-driven or manually-driven heads on which the cameras are placed. The reason for this is the ergonomy of the existing systems that do not accept the bearing points of the tripod for adjusting the seats and the optical axes which, when incorporated in the modules, allow corrective adjustments of the altitudes of the optical axes.

The usual systems do not allow this type of application because they are not designed to receive this correction system which requires a flatness and surface condition of high quality in the three regions where the tripods supporting the modules bear.

The supports therefore form part of the camera/module/support assembly because they provide the interface between the top part of the manual head (handcrank or fluid) or motor-driven head and the modules. They cannot be incorporated in the modules other than by a fastening, the flexibility of which enables the tripods to correct the seats and altitudes of the optical axes.

The supports also allow for the distribution of the signals between the modules and to the external power, storage or management sources.

The supports make it possible to include a microcontroller to manage all the parameters of the motion control and the recording of short sequences.

This microcontroller can be placed in a module or be incorporated under the mirror in the right-angle positions and under the optics in the side-by-side versions. Its fastening will then remain identical.

The supports 7, 51, 52 can also incorporate, within their thickness, management cards for certain axes or functionalities in order to reduce the volume of the modules or to miniaturize the system as a whole.

d. Connectors:

All the connectors are compatible between modules and supports.

Interconnection can be made between the modules alone, the supports alone and be crossed between supports and modules.

The interconnection between optics slaved by the motion control can pass either through the modules or through the supports.

III) Combination of Modules:

There are many possible combinations of the modules, because there are mainly 6 different modules for the same size of camera, D2, G2, D1, G1, D1' and G1', which gives many possible pairings of the modules for stereoscopy with two points of view and even more for relief with more than two points of view.

D2: right translation and rotation module; G2:

left translation and rotation module: FIG. 2a shows a right module D2 and a left module G2 placed side-by-side.

D1': lightened right rotation module (compatible with G2), and G1', lightened left rotation module (compatible with D2, FIG. 8) for high-angle shots, helicopter shooting, etc. These modules are positioned on the module D2/G2. The multiple-positioning is mechanical and keeps the translation within a determined value.

All these modules are constituent elements of camera systems with N points of view (N greater than or equal to 2).

For shooting systems with more than 2 points of view, the progressive variation of the vergences and center-to-center distances may result from different identical mechanisms actuated by systems with proportional effects or, on the other hand, from scale mechanisms activated by a single gear motor for the right cameras and a single gear motor for the left camera. These mechanisms can then be incorporated in the supports of the modules as in FIG. 5 which shows a very thick right-angle bracket containing the translation mechanisms.

Figure 7:
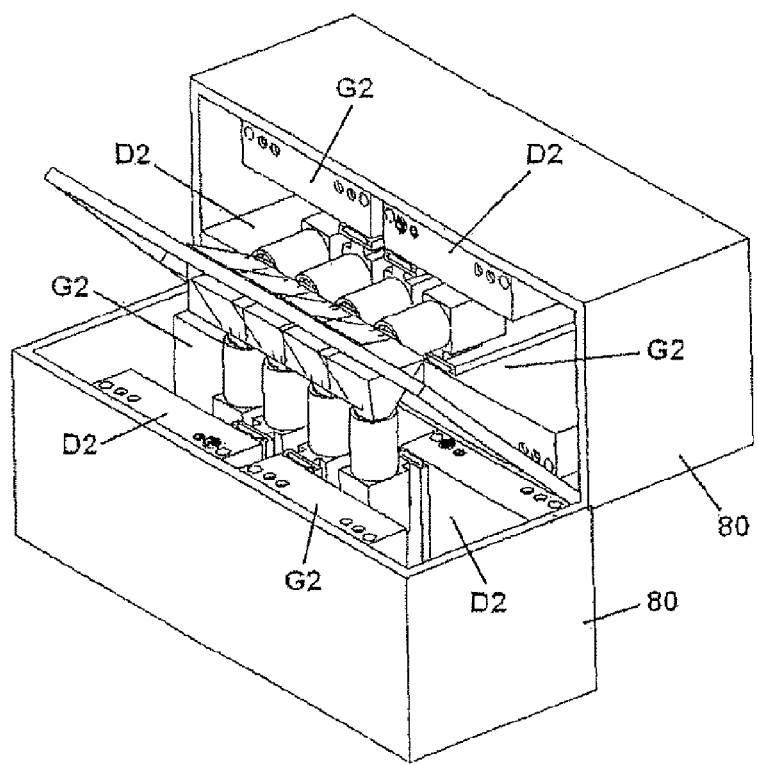
FIG. 7 illustrates a head-to-tail coupling of the right and left modules, notably for a bracket mounting.

FIG. 7 shows a shooting assembly in which the modules are positioned head-to-tail in a casing 80 with double support to provide a space saving. In the example shown, sets of 4 cameras are obtained comprising two modules D2 and two modules G2 (or even two modules D1 and two modules G2). Each set is housed in a casing 80 and forms a shooting assembly that can be used alone (for relief shooting with 4 cameras) or, as shown in the right-angle type mounting (with the optical axes of the cameras of both sets interleaved) for relief shooting with 8 cameras. It will be understood that this head-to-tail mounting relates to the case of sets comprising an even number of cameras (2, 4, 6, etc.). It will also be noted that this mounting requires the images from one in every two cameras to be turned over, which is easy to do with digital cameras.

Figure 8:
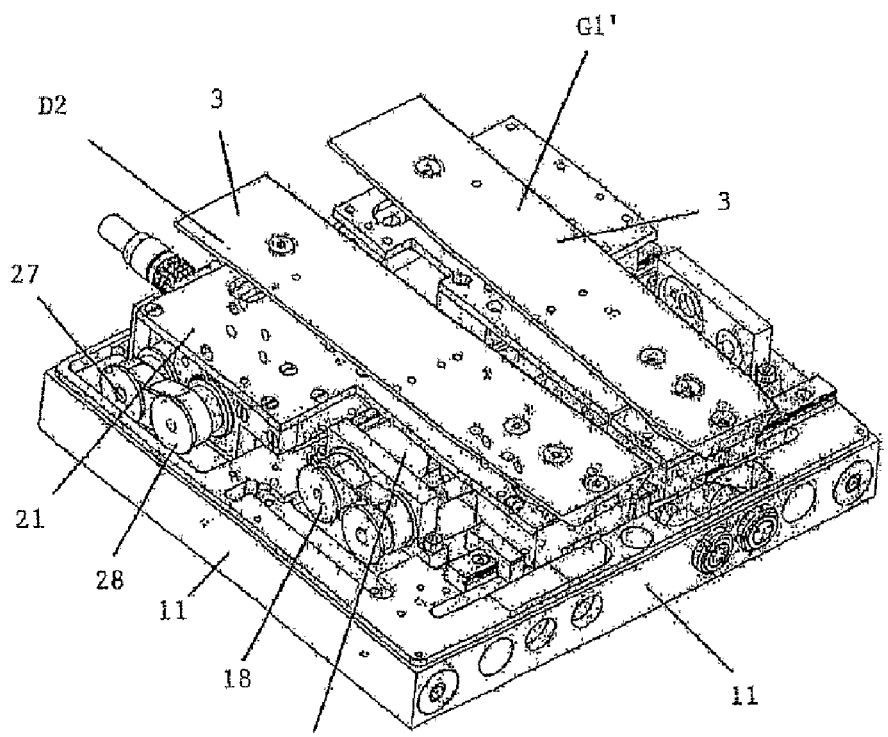
FIG. 8 illustrates a complex module incorporating, on one and the same support 11, two individual modules, one of which has a translation and rotation function and the other of which has only a rotation function.

FIG. 8 shows a module G1' mounted with a module D2 on a common body 11. In this case, it should be noted that the seat and optical axis corrections between the two modules are possible only by manual adjustment. It is therefore a configuration that is reserved for extreme shooting conditions such as high-angle shots or models when the aim is to enter into different sets. The manual corrections are reserved for the fixed optics which comprise only focus and diaphragm.

IV) Inclusion of the modules in the very design of the cameras dedicated to relief with 2 or N points of view.

The cameras can incorporate the modules and their supports 7, 51, 52 from their design. This system makes it possible to further reduce the overall bulk by having the sensors that make up the cameras as close as possible to the modules and by dimensioning all the mechanical parts of the rotation part so that no element exceeds the bulk needed for the sensor mounting apart from, in the case of the modules of type D2 and G2 which incorporate the center-to-center distance, the width needed to adjust the center-to-center distance.

For the modules of type D1 and G1 or D1' and G1', the mounting of the sensor gives the limits of the maximum bulks of the modules.

This device makes it possible to manufacture miniature cameras intended for relief filming.

The advantages are:

A space saving in altitude: possible elimination of the dovetail.

Orthogonal and parallel design of the front camera face and sensor relative to the module in all directions.

Strict retention of the altitude of the optical axes.

Ease of optical centering without the introduction of defects of parallelism.

Great height reduction from the support/module/camera stacks.

Correction as early as manufacture of the seat and optical axis variations.

The cameras, modules and supports in this configuration become a single integrated assembly.

Figure 10:
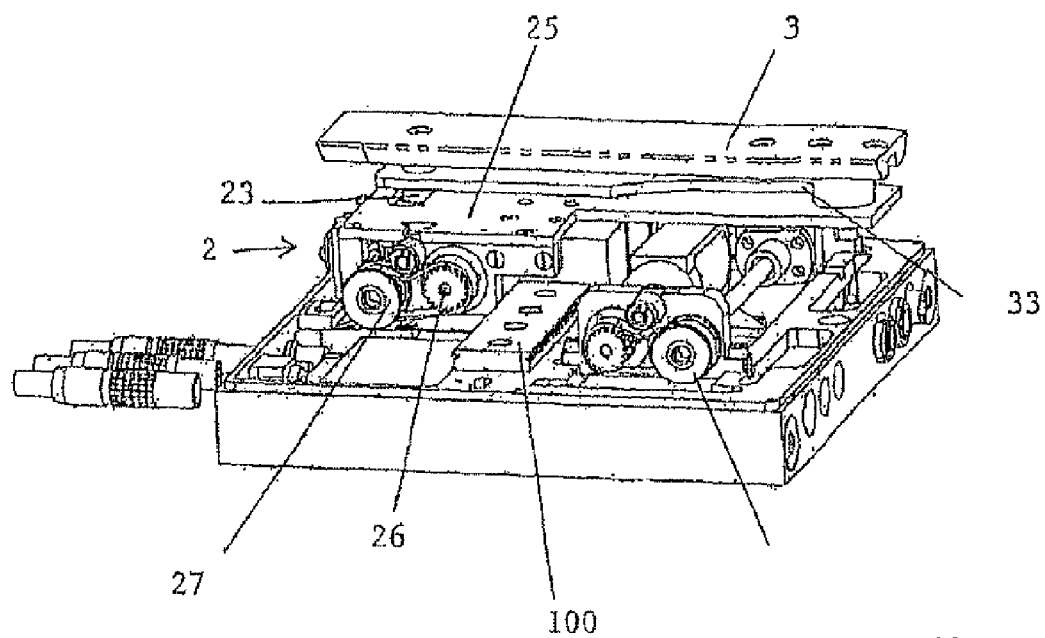
FIG. 10 illustrates a variant of the invention with a single rail.

FIG. 10 shows a module equipped with a single rail 100. In a preferred configuration, the device for driving the mobile carriage 2 in translation is housed between the single rail 100 and the rotation axis 33 of the camera support 3, the rail and the translation driving device being contained between the rotation axis and its actuator.

Figure 11:
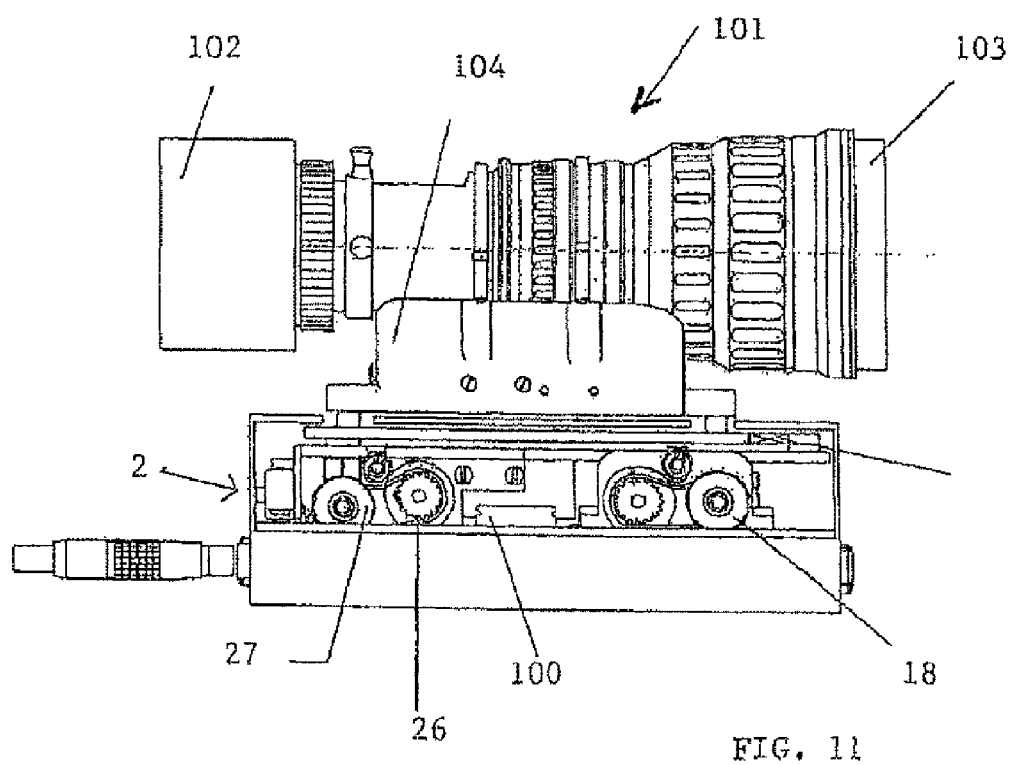
FIG. 11 illustrates a preferred method of mounting a shooting device.

FIG. 11 shows a preferred method of mounting a shooting device 101 that has, on the one hand, a shooting casing 102 including a sensor and on the other hand, an optic 103. The optic 103 is attached to the rotary element 3, for example via the casing which contains the optical motor drives 104.

The invention claimed is:

1. A camera-holding module for relief shooting, characterized in that it comprises:

a carriage that is mobile in translation in a translation plane and that has a guiding means for cooperating with at least one guiding rail supported by a first face of a module body, as well as a device for driving said mobile carriage in translation, a camera-holding rotary element supported by the mobile carriage and having a rotation axis and a guiding element, as well as an actuator cooperating with the guiding element to induce its movement so as to rotate the camera-holding element, and in that the device for driving the mobile carriage in translation is positioned between the actuator and the rotation axis of the rotary element, wherein the rotation axis comprises an elastic element allowing a said rotational driving movement in one direction and having a greater stiffness in the other directions.

2. A camera-holding module for relief shooting, characterized in that it comprises:
- a carriage that is mobile in translation in a translation plane and that has a guiding means for cooperating with at least one guiding rail supported by a first face of a module body, as well as a device for driving said mobile carriage in translation,
- a camera-holding rotary element supported by the mobile carriage and having a rotation axis and a guiding element, as well as an actuator cooperating with the guiding element to induce its movement so as to rotate the camera-holding element, and in that the device for driving the mobile carriage in translation is positioned between the actuator and the rotation axis of the rotary element,
- wherein the module has a three-point seat correction device which is incorporated in the module body, and which comprises three control members housed in grooves formed in a second face of the module body opposite to said first face, as well as three elements that are mobile perpendicularly to the translation plane of the module.

3. A camera-holding module for relief shooting, characterized in that it comprises:
- a carriage that is mobile in translation in a translation plane and that has a guiding means for cooperating with at least one guiding rail supported by a first face of a module body, as well as a device for driving said mobile carriage in translation,
- a camera-holding rotary element supported by the mobile carriage and having a rotation axis and a guiding element, as well as an actuator cooperating with the guiding element to induce its movement so as to rotate the camera-holding element, and in that the device for driving the mobile carriage in translation is positioned between the actuator and the rotation axis of the rotary element,
- a control device able to generate parameters for controlling the mobile carriage and the camera-holding rotary element of said module or modules, as well as at least the focusing of the cameras supported by the module or modules,
- wherein the control device has
- a first level 1 operating mode in which said parameters are adjusted independently of one another,
- a second level 2 operating mode in which at least one parameter is slaved to a parameter, and
- a third level 3 operating mode in which a first parameter is slaved to a second parameter, which is slaved to at least one third parameter.

4. The module as claimed in claim 3, characterized in that the first parameter is the center-to-center distance between two cameras of two modules, the second parameter is the vergence angle between said two cameras, and the third parameter is the focusing distance.

5. A relief shooting device, characterized in that it comprises:
- at least one camera-holding module for relief shooting; and
- a control device,
- the camera-holding module comprising:
- a carriage that is mobile in translation in a translation plane and that has a guiding means for cooperating with at least one guiding rail supported by a first face of a module body, as well as a device for driving said mobile carriage in translation,
- a camera-holding rotary element supported by the mobile carriage and having a rotation axis and a guiding element, as well as an actuator cooperating with the guiding element to induce its movement so as to rotate the camera-holding element, and in that the device for driving the mobile carriage in translation is positioned between the actuator and the rotation axis of the rotary element,
- wherein the control device is able to generate parameters for controlling the mobile carriage and the camera-holding rotary element of said module or modules, as well as at least the focusing of the cameras supported by the module or modules, and
- wherein the modules are mounted at right angles, at least two modules being positioned either side of a semi-reflecting return mirror.

6. A relief shooting device, characterized in that it comprises:
- at least one camera-holding module for relief shooting; and
- a control device,
- the camera-holding module comprising:
- a carriage that is mobile in translation in a translation plane and that has a guiding means for cooperating with at least one guiding rail supported by a first face of a module body, as well as a device for driving said mobile carriage in translation,
- a camera-holding rotary element supported by the mobile carriage and having a rotation axis and a guiding element, as well as an actuator cooperating with the guiding element to induce its movement so as to rotate the camera-holding element, and in that the device for driving the mobile carriage in translation is positioned between the actuator and the rotation axis of the rotary element,
- wherein the control device is able to generate parameters for controlling the mobile carriage and the camera-holding rotary element of said module or modules, as well as at least the focusing of the cameras supported by the module or modules, and
- wherein the modules are incorporated in the cameras.

7. A relief shooting device, characterized in that it comprises:
- at least one camera-holding module for relief shooting; and
- a control device,
- the camera-holding module comprising:
- a carriage that is mobile in translation in a translation plane and that has a guiding means for cooperating with at least one guiding rail supported by a first face of a module body, as well as a device for driving said mobile carriage in translation,
- a camera-holding rotary element supported by the mobile carriage and having a rotation axis and a guiding element, as well as an actuator cooperating with the guiding element to induce its movement so as to rotate the camera-holding element, and in that the device for driving the mobile carriage in translation is positioned between the actuator and the rotation axis of the rotary element,
- wherein the control device is able to generate parameters for controlling the mobile carriage and the camera-holding rotary element of said module or modules, as well as at least the focusing of the cameras supported by the module or modules, and
- wherein at least one pair of symmetrical modules are mounted head-to-tail in one and the same casing.

8. The device as claimed in claim 7, characterized in that it comprises two said casings right-angle-mounted either side of a semi-reflecting mirror, with the axes of the cameras supported by the modules mounted in the respective casings interleaved.

* * * * *